3,072,645
17α:21-DIHYDROXY-20-KETONES OF THE PREGNANE SERIES AND PROCESS FOR THEIR MANUFACTURE
Albert Wettstein, Riehen, and Karl Heusler, and Peter Wieland, Basel, Switzerland, assignors to Ciba Corporation, a corporation of Delaware
No Drawing. Filed Aug. 1, 1960, Ser. No. 46,373
Claims priority, application Switzerland Sept. 4, 1959
14 Claims. (Cl. 260—239.55)

This invention provides a new process for the manufacture of 17α:21-dihydroxy-20-ketones of the pregnane series and 21 esters thereof by using as starting materials 20-enol esters of pregnane-20-ketones oxygenated in the 21-position, that is to say, free or esterified 21-hydroxy compounds and more especially 21-als and free and esterified 21-acids. The latter starting materials have not hitherto been used for making the aforesaid dihydroxyketones.

It is known that a 17α-hydroxyl group can be introduced into pregnane-20-ketones unsubstituted in the 21-position by first converting the 20-ketone into a $\Delta^{17(20)}$-enol-acetate, oxidizing the latter with an organic peracid, and then obtaining the 17α-hydroxy-20-ketone by hydrolysis from the epoxide formed. This process has not hitherto been successfully applied to 21-oxygenated compounds. For introducing a 17α-hydroxyl group into pregnane-20-ones, which contain in the 21-position a free or esterified hydroxyl group, two processes have mainly been used. In the first process hydrogen cyanide is first additively combined at the 20-keto group, water is split off from the resulting cyanohydrin, for example, by means of thionyl chloride or phosphorus oxychloride, and the resulting 17:20-double bond is hydroxylated with osmium tetroxide or potassium permanganate. The 17α-hydroxy-20-cyanhydrin so formed can then easily be converted into the 20-ketone by splitting off hydrogen cyanide. In the second process a 20-ketone unsaturated in the 16:17-position is used as starting material and the aforesaid double bond is oxidized with hydrogen peroxide, the resulting 16:17α-epoxide is split up with hydrogen halide to form the halogen hydrin, and then the 16-halogen atom is reductively eliminated. When a starting material is used which contains in the 21-position an oxo group, that is to say, containing at the 20-carbon atom an aldehyde group or a free or esterified carboxyl group, these processes do not lead to the desired 17α:21-dihydroxy-20-ketone. Furthermore, the known processes use acid reagents in one or more stages, so that it is not possible to apply them to starting materials which contain acid-sensitive substituents, for example, ketals and acetals.

On the other hand the process of this invention is applicable to all 21-oxygenated pregnane-20-ones, but especially to 21-als and 21 acids and esters thereof. It also completely avoids the use of acid reagents, so that even acid-sensitive starting materials can be hydroxylated in the 17-position easily by the new process. The oxidation can also be applied to compounds which contain in the ring skeleton further double bonds, for example, in the 5:6-position, without these bonds being attacked to any appreciable extent.

In the process of this invention a complex metal hydride is reacted in a hydroxyl-free solvent with a $\Delta^{17(20)}$-20-enol-ester of the pregnane series oxygenated in the 21-position. In the resulting complex, if desired, after destroying the excess of reducing agent by the addition of a ketone, a hydroxylating metal oxide, for example, osmium tetroxide or tungsten trioxide, is additively combined at the 17:20-double bond, and finally the addition product is hydrolyzed, and, if desired, the free 21-hydroxyl group is esterified.

It is probable, for example, that the following intermediates are formed during the process of the invention:

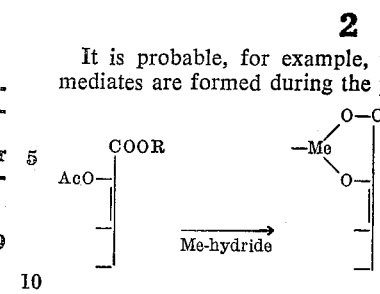
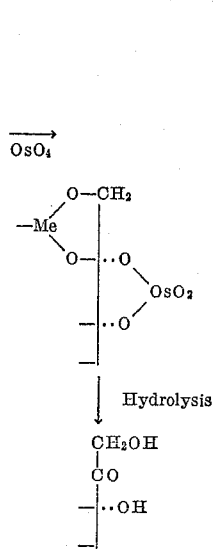

For the reaction with the complex metal hydride there is used a hydride which is capable of reducing ester groups in a hydroxyl-free solvent, for example, a complex aluminum hydride such as lithium aluminum hydride, lithium-trimethoxy-aluminum hydride, magnesium aluminum hydride, sodium aluminum hydride or a complex boron hydride such as lithium boron hydride, lithium- or sodium-trialkoxy-boron hydrides, aluminum boron hydride, calcium boron hydride, strontium boron hydride or barium boron hydride. As solvents cyclic or open-chain ethers are suitable such as tetrahydrofuran, dioxane, diethyl ether, glycol dimethyl ether, polyglycol dimethyl ether etc. The enolic-20-hydroxyl group esterified with a carboxylic acid is converted during the reaction into a metal enolate salt and a 21-oxo group or 21-acid group is reduced to the carbinol group.

The 21-alcoholate-20-enolate complex obtained by reaction with the complex metal hydride is then reacted in the same solvent with approximately one molar equivalent of a hydroxylating metal oxide, especially osmium tetroxide. As this oxidizing agent is attacked by the aforesaid reducing agents, it is of advantage to destroy any excess of hydride present before the osmium tetroxide is added, only such agents being used as do not decompose the alcoholate-enolate complex. It is therefore especially advantageous to add an aliphatic or alicyclic ketone, for example, acetone, methyl ethyl ketone, cyclopentanone, cyclohexanone etc. The enolate double bond reacts extremely rapidly with the oxidizing agent and there is therefore no difficulty in selectively oxidizing compounds containing further isolated double bonds, for example, in the 5:6-position.

As the keto group is present in the osmium tetroxide addition product in a ketal-like form, the hydrolysis takes place very easily, for example, with water. In order to split the osmate ester bond completely, it is, however, of advantage to carry out the hydrolysis under reductive conditions, for example, with the use of a solution of ammonium sulfite or sodium sulfite.

If desired, a free 21-hydroxyl group may be esterified at any stage. For this purpose there are used reactive derivatives of saturated or unsaturated aliphatic or cycloaliphatic, aromatic, araliphatic or heterocyclic carboxylic acids and of acids belonging simultaneously to more than one of these series, which contain from 1 to 20 carbon atoms, for example, formic acid, acetic acid, trifluoracetic acid, propionic acid, a butyric acid, a valeric acid such as n-valeric acid or trimethylacetic acid, a caproic acid such as β-trimethyl-propionic acid, oenanthic acid, caprylic acid, pellargonic acid, capric acid, an undecylic acid, for example, undecylenic acid, lauric acid, myristic acid, palmitic acid or a stearic acid, for example, oleic acid, or a cyclopentyl-, cyclohexyl- or phenyl-acetic or -propionic acid, benzoic acid, hexahydrobenzoic acid, furane-2-carboxylic acid, a nicotinic acid, and also dicarboxylic acids such as oxalic, succinic acid or glutaric acid, or substituted carboxylic acids such as β-keto-carboxylic acids, for example, acetoacetic acid, propionyl-acetic acid, butyryl acetic acid or capryl-acetic acid or amino-acids.

The pregnane-20-enol esters used as starting materials contain in the 21-position a free or esterified hydroxyl group or at the 20-carbon atom an aldehyde group or a free or esterified carboxyl group. The aforesaid aldehydes are easily obtainable from the 20-keto-21-hydroxy-compounds in known manner, for example, by oxidation with cupric acetate. The pregnane-20-one-21-als so obtained are converted e.g. into 20-enol-acetates by acetylation with glacial acetic acid-pyridine-acetic anhydride. The 20-enol-esters having an ester group in the 21-position are obtainable with special advantage by the process described in our patent application No. 35,135, filed June 10, 1960. The process consists in catalytically hydrogenating a $\Delta^{16}$-20-oxo-pregnane-21-acid ester in a neutral medium and acylating the $\Delta^{17(20)}$-20-hydroxy-pregnene-21-acid ester.

The enol-acylates used as starting materials in the process of this invention are more especially esters of lower fatty acids, for example, acetic acid, propionic acid, or butyric acid, or of aromatic acids, such as benzoic acid, or substituted benzoic acids such as para-methoxy-benzoic acid etc. The starting materials may also contain further oxygen functions, especially free or protected, for example, ketalized, oxo groups, for example, in the 3-, 11- and/or 18-positions, or free, esterified or etherified hydroxyl groups, for example, in the 3-, 6-, 11- and/or 16-positions, or methyl groups, for example, in the 2-, 6- or 16-positions. By the process of this invention, it is possible, for example, by starting from $\Delta^{5:17(20)}$-3-ethylenedioxy - 11β:18 - oxido - 18 - tetrahydropyranyloxy - 20-acyloxy-pregnadiene-21 acid esters to make $\Delta^5$-3-ethylenedioxy - 11β:18 - oxido - 18 - tetrahydropyranloxy - 17α: 21-dihydroxy pregnene-20-one and 21-esters thereof which can be converted by mild hydrolysis of the protective groups in the 3- and 18-positions into 17α-hydroxy-aldosterone or 21-esters thereof. Other starting materials are, for example, a $\Delta^{5:17(20)}$-3-ethylenedioxy-20-acyloxy-pregnadiene-21-al and the corresponding compound substituted in the 11β-position by a hydroxyl group. By using the corresponding 11-keto-compound as starting material it is reduced in the course of the process to the 11β-hydroxyl compound. From the compound unsubstituted in the 11-position there is obtained Reichstein's Substance S, and the 11β-hydroxy-compound and the 11-keto-compound yield derivatives of hydrocortisone.

By the process of the present invention there can be prepared any of the known 17α-hydroxyl-20,21-ketols of the pregnane series, among which there are several important corticoidal hormone compounds, such as those mentioned above.

The invention also provides compounds of the formula

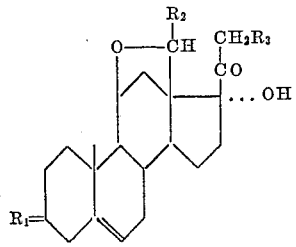

in which $R_1$ represents a protected oxo group, especially a ketalized oxo group, and $R_2$ and $R_3$ each represent a free, esterified or etherified hydroxyl group. These compounds are important intermediate products for the manufacture of 17α-hydroxy-aldosterone and esters thereof. Especially important are those compounds in which $R_1$ represents a lower alkylene dioxy group such as ethylenedioxy- or propylenedioxy-group, $R_2$ represents an etherified hydroxyl group preferably one etherified with an aliphatic, cycloaliphatic aromatic or araliphatic alcohol with 1–10 carbon atoms, for example, a tetrahydropyranyloxy group, and $R_3$ represents a hydroxyl or an acyloxy group, and also 18:21-diesters and 21-monoesters of 17α-hydroxy-aldosterone, the esters being derived from the acids mentioned above, for example its 18:21-diacetate, 21-monoacetate, 21-trimethyl-acetate, 21-cyclopentyl-propionate, 21-furoate, 21-propionate etc.

The following examples illustrate the invention:

*Example 1*

To a solution of 207 mg. of $\Delta^{5:17(20)}$-3-ethylenedioxy-20-acetoxy-21-oxo-pregnadiene in 5 cc. of absolute tetrahydrofuran is added, while cooling with ice and stirring in a current of nitrogen, 0.8 cc. of a 0.95 molar solution of lithium-aluminium hydride in tetrahydrofuran. After stirring the mixture for one hour at 0° C. and adding 0.25 cc. of cyclohexanone the whole is stirred for a further 3 hours at 0° C. There are then added 100 mg. of osmium tetroxide, whereupon the solution immediately becomes brown-black. The whole is stirred for a further hour at 0° C. and then for 14 hours at room temperature. The reaction solution is rinsed out with 33 cc. of methanol, while cooling with water and stirring, into a solution of 1.33 grams of ammonium sulfite in 33 cc. of water and 0.18 cc. of glacial acetic acid, and the whole is stirred for one hour at room temperature. Celite is then added, the mixture is filtered through Celite, the Celite is washed with 100 cc. of methanol, and the filtrate is evaporated at a bath temperature of 50–60° C. under the reduced pressure of a water jet pump to about 25 cc. After diluting the mixture with water and extracting it three times with methylene chloride, the organic solutions are washed twice with water, dried and evaporated under the reduced pressure of a water jet pump. The crude crystalline $\Delta^5$-3-ethylenedioxy - 17α:21 - dihydroxy-pregnene-20-one (210 mg.) so obtained is heated with a mixture of 2 cc. of pyridine and 2 cc. of acetic anhydride for 1½ hours at 50–55° C. The mixture is then evaporated under the reduced pressure of a water jet pump, the residue is dissolved in xylene, and the solution is evaporated under the reduced pressure of a water jet pump, and this operation is repeated once more with xylene and again with benzene. The crystalline crude $\Delta^5$-3-ethylenedioxy-17α-hydroxy-21-acetoxy-pregnene-20-one is immersed with 5 cc. of glacial acetic acid for 3 minutes in a bath at 100° C., and, after the addition of 0.5 cc. of water, the whole is allowed to stand for a further 8 minutes in the bath. The reaction solution is cooled and diluted with water, and extracted three times with methylene chloride, and the organic solutions are washed with water, a saturated solution of sodium hydrogen carbonate, and water. The residue obtained by drying and evaporating the methylene chloride solutions is dissolved in 5 cc. of benzene and the solution is chromatographed over 10 grams of silica gel containing 15% of water. The fractions eluted with mixtures of benzene and ethyl acetate (9:1) and (4:1) contain $\Delta^4$-3:20-dioxo-17α-hydroxy - 21 - acetoxy-pregnene, which after crystallization from a mixture of methylene chloride and ether, shows no lowering of melting point in admixture with authentic material and has an identical infrared spectrum.

The $\Delta^{5:17(20)}$-3-ethylenedioxy-20-acetoxy-21-oxo-pregnadiene used as starting material is prepared as follows:

To 2.5 grams of $\Delta^5$-3-ethylenedioxy-20-oxo-21-hydroxy-pregnene and 50 cc. of methanol is added at 60° C. a warm solution of 3.75 grams of copper acetate in 50 cc. of methanol of 80% strength and 0.1 cc. of glacial acetic acid. After stirring the mixture for 20 minutes at 60° C. it is filtered through Celite, the Celite is washed with methylene chloride, and the filtrate is mixed with 500 mg. of Komplexon III and washed twice with water. The aqueous solutions are extracted once with methylene chloride, and the organic solutions are united and dried and evaporated under the reduced pressure of a water jet pump. By recrystallization from a mixture of methylene chloride and ether with the use of 150 mg. of Carboraffin there are obtained 1.74 grams of $\Delta^5$-3-ethylene-dioxy-20:21-dioxo-pregnene. The latter is heated with a mixture of 16 cc. of pyridine, 16 cc. of acetic anhydride and 16 cc. of glacial acetic acid for 2½ hours at a bath temperature of 60° C. The whole is then poured into 300 cc. of ice water and extracted 3 times with 200 cc. of methylene chloride. The organic solutions are washed with 150 cc. of 2 N-hydrochloric acid, 150 cc. of water, 150 cc. of a 0.5 N solution of sodium hydrogen carbonate and 150 cc. of water. The organic solutions are dried and evaporated under the reduced pressure of a water jet pump, and the residue is dissolved in 30 cc. of benzene and chromatographed over 90 grams of silica gel containing 15% of water. In the fractions eluted with a mixture of benzene and ethyl acetate (19:1) is found $\Delta^{5:17(20)}$-3-ethylenedioxy-20-acetoxy-21-oxo-pregnadiene, of which 800 mg. are obtained melting at 181–187° C., after recrystallization from a mixture of methylene chloride and ether with the use of 20 mg. of Carboraffin. The infra-red spectrum of the product taken up in methylene chloride exhibits, inter alia, the following characteristic bands: 5.66$\mu$ (acetate); 5.92$\mu$ (aldehyde); 6.05$\mu$ ($\Delta^{17(20)}$-double bond); and 19.13$\mu$ (ketal).

*Example 2*

To a solution of 385 mg. of d:l-$\Delta^{5:17(20)}$-3-ethylenedioxy - 11$\beta$:18 - oxido - 18 - tetrahydropyranloxy - 20-actoxy-pregnadiene-21-acid methyl ester in 10 cc. of absolute tetrahydrofuran are added, while cooling with ice and stirring in a current of nitrogen, 1.4 cc. of a 0.95 molar solution of lithium aluminium hydride in tetrahydrofuran. After stirring the mixture for one hour at 0° C., adding 0.4 cc. of cyclohexanone, and stirring the mixture for a further 3¼ hours at 0° C., 140 mg. of osmium tetroxide are added. The brown-black reaction solution is stirred for one hour at 0° C. and for 18 hours at room temperature, and, while stirring and cooling with water, is rinsed out with 46 cc. of methanol into a solution of 1.85 grams of ammonium sulfite in 46 cc. of water and 0.1 cc. of glacial acetic acid. After stirring the whole for one hour and adding Celite, the mixture is filtered through Celite, the Celite is washed with 250 cc. of methanol, and the filtrate is evaporated under the reduced pressure of a water jet pump at a bath temperature of 50° C. to about 25 cc. The residue is then diluted with water, extracted three times with methylene chloride and the solutions are washed twice with water. The organic solutions are dried and evaporated under the reduced pressure of a water jet pump and the residue is crude d:l-$\Delta^5$-3-ethylene-dioxy-11$\beta$:18 - oxido - 18 - tetrahydropyranyloxy - 17$\alpha$:21-dihydroxy-pregnene-20-one. The whole is heated in an atmosphere of nitrogen with a mixture of 2 cc. of pyridine and 2 cc. of acetic anhydride for 2 hours at 50° C. The mixture is then evaporated at the same bath temperature under the reduced pressure of a water jet pump, the residue is dissolved in xylene, the solution is evaporated under the reduced pressure of a water jet pump, and this operation is repeated once with xylene and again with benzene. The residue that partially crystallizes is dissolved in a mixture of 2 cc. of methylene chloride and 4 cc. of benzene and the solution is chromatographed over 20 grams of silica gel containing 15% of water. The fractions eluted with mixtures of benzene and ethyl acetate (9:1) and (4:1) contain d:l-$\Delta^5$-3-ethylenedioxy-11$\beta$:18-oxido - 18 - tetrahydropyranyloxy - 17$\alpha$ - hydroxy - 20-oxo-21-acetoxy-pregnene, of which 54 mg. melting at 259–264° C. and 56 mg. melting at 232–236° C. are obtained by recrystallization from a mixture of methylene chloride and ether. The difference in melting point is largely due to the fact the compound obtained is not unitary with regard to the centre of asymmetry in the tetrahydropyranyl ring. The infra-red spectrum of the crystallizate (solvent:methylene chloride) melting at 259–264° C. has the following bands: 2.80$\mu$+2.90$\mu$ (hydroxyl); 5.70$\mu$ (acetate); 5.77 (ketone); and 8.13$\mu$ (acetate).

By using, instead of acetic anhydride, propionic anhydride, trimethylacetic acid chloride or cyclopentyl-propionic acid chloride, there is obtained the corresponding 21-propionate, trimethyl-acetate or cyclopentyl-propionate.

56 mg. of the crystallizate melting at 232–236° C. obtained as described above and 2 cc. of glacial acetic acid are immersed for 3 minutes in a bath of 100° C., 0.2 cc. of water is added, and the whole is kept in the bath for a further 6 minutes. The mixture is then cooled, evaporated under the reduced pressure of a water jet pump, and chromatographed on 30 sheets of paper in the system formamide/benzene-chloroform (1:1). The zone that absorbs strongly in the ultra-violet, has a positive reaction with blue tetrazolium and has an R$_f$-value of about 0.25 is cut out, disintegrated, and pasted with 150 cc. of tetrahydrofuran of 20% strength. The mixture is then filtered, the filter residue is pasted with 100 cc. of tetrahydrofuran of 20% strength, the mixture is filtered, and these operations are repeated once with 100 cc. of tetrahydrofuran of 20% strength and 3 times with 100 cc. of pure tetrahydrofuran. The combined filtrates are evaporated at a bath temperature of 45° C. to about 250 cc. under the reduced pressure of a water jet pump, and the residue is extracted 3 times with methylene chloride, and then the organic solutions are washed three times with water. The methylene chloride solutions are dried, evaporated under the reduced pressure of a water jet pump, and the residue is dissolved in a mixture of acetone and chloroform with 14 mg. of Carboraffin and the mixture is boiled for a short time, then filtered and the filter residue is washed with acetone and chloroform. From the concentrated filtrate of d:l-17$\alpha$-hydroxy-aldosterone-21-monoacetate crystallizes after the addition of ether, melts at 202–203° C. The infra-red spectrum and the product taken up in chloroform exhibits, inter alia, the following characteristic bands: 2.78$\mu$ (hydroxl); 5.70$\mu$ with an inflection at 5.78$\mu$ (acetate+20-ketone); and 5.98$\mu$+6.16$\mu$ ($\Delta^4$-3-ketone).

In an analogous manner there can be obtained from the 3-ketal-18-tetrahydropyranyl ether of the 21-propionate, 21-trimethylacetate or 21-cyclopentyl-propionate the corresponding 21-ester of 17$\alpha$-hydroxy-aldosterone.

What is claimed is:

1. Process for the manufacture of 17$\alpha$,21-dihydroxyketones of the pregnane series which comprises reacting a 21-oxygenated-$\Delta^{17(20)}$-20-enol ester of the pregnane series with a complex metal hydride in a hydroxyl-free solvent, destroying the excess complex metal hydride in the resulting complex by the addition of a ketone, adding a hydroxylating metal oxide to the mixture obtained thereby, and hydrolyzing the resulting product.

2. Process according to claim 1, wherein the free 21-hydroxyl group is esterified.

3. Process according to claim 1, wherein there is used as starting material a $\Delta^{17(20)}$-20-enol ester of the pregnane series which contains in the 21-position an oxo group and a hydrogen atom.

4. Process according to claim 1, wherein there is used as starting material a $\Delta^{17(20)}$-20-enol ester of the pregnane series which contains in the 21-position an oxo group and a free hydroxyl group.

5. Process according to claim 1, wherein there is used as starting material a $\Delta^{17(20)}$-20-enol ester of the pregnane series which contains in the 21-position an oxo group and an etherified hydroxyl group.

6. Process according to claim 1, wherein a 20-enol ester of a 20-oxo pregnane-21-acid ester is used as starting material.

7. Process according to claim 1, wherein a 20-enol ester of 20-oxo-pregnane-21-al is used as starting material.

8. Process according to claim 1, wherein the complex metal hydride used is lithium aluminum hydride.

9. Process according to claim 1, wherein the hydroxylating metal oxide used is osmium tetroxide.

10. The $\Delta^5$-3-ethylenedioxy-11$\beta$,18-oxido-18-tetrahydropyranyloxy-17$\alpha$,21-dihydroxy-pregnene-20-one.

11. A 21-ester of the compound claimed in claim 10.

12. The $\Delta^5$-3-ethylenedioxy-11$\beta$,18-oxido-18-tetrahydropyranyloxy-17$\alpha$-hydroxy-21-acetoxy-pregnene-20-one.

13. A compound of the formula

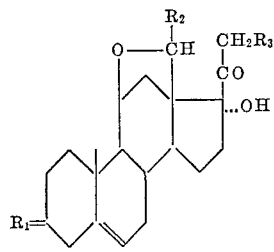

wherein $R_1$ represents a ketalized oxo group, $R_2$ is tetrahydropyranyloxy, and $R_3$ is hydroxyl.

14. A compound of the formula

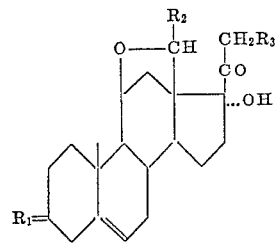

wherein $R_1$ represents a ketalized oxo group, $R_2$ is tetrahydropyranyloxy, and $R_3$ is esterified hydroxyl.

References Cited in the file of this patent

UNITED STATES PATENTS 2,862,925   Reichstein et al. _____ Dec. 2, 1958
2,948,738   Reichstein et al. _____ Aug. 9, 1960